J. D. LANE.
Lamp.

No. 198,632.  Patented Dec. 25, 1877.

Witnesses:
Fred. Haynes
L. Allen

Inventor
John D. Lane
by his Attorneys
Brown & Allen

UNITED STATES PATENT OFFICE.

JOHN D. LANE, OF BROOKLYN, NEW YORK.

IMPROVEMENT IN LAMPS.

Specification forming part of Letters Patent No. 198,632, dated December 25, 1877; application filed September 7, 1877.

*To all whom it may concern:*

Be it known that I, JOHN D. LANE, of Brooklyn, in the county of Kings and State of New York, have invented an Improvement in Lamps for Heating and Illumination; and I do hereby declare that the following is a full, clear, and exact description of the same, reference being had to the accompanying drawing, forming part of this specification.

The objects sought in my invention are the regular and uniform supply of oil or other liquid hydrocarbon to the burner from reservoirs of any capacity, and facility in reaching the regulating device, combined with great compactness in construction.

Figure 1:
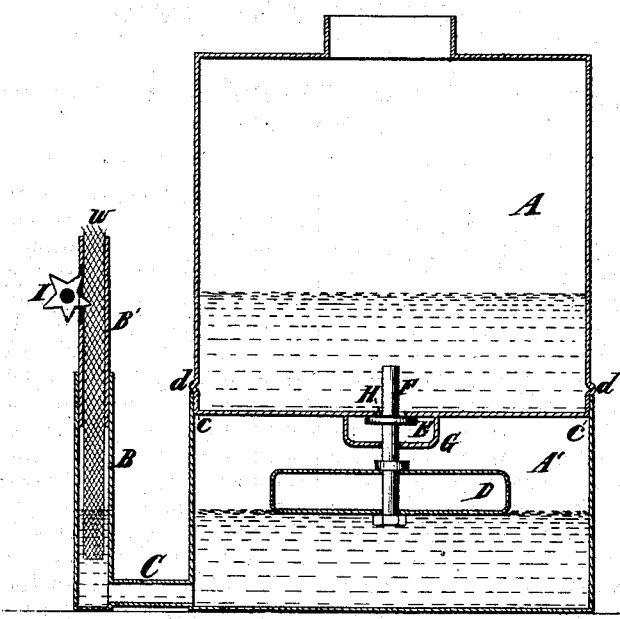
Figure 2:
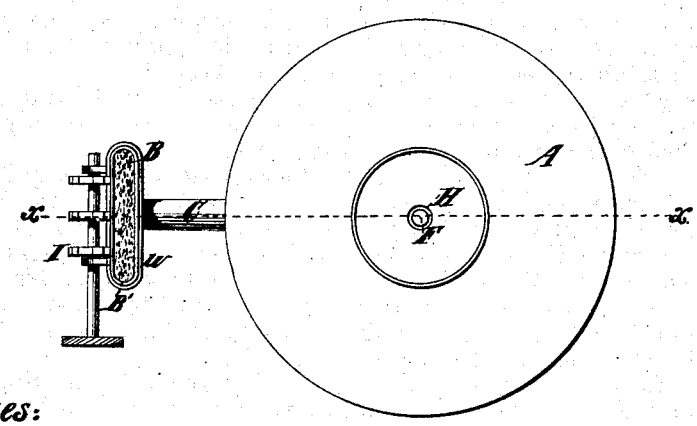

Figure 1 in the accompanying drawing is a central vertical section through a lamp constructed in accordance with my invention, the section being made on the line $x\ x$ in Fig. 2. Fig. 2 is a top view of the same.

A represents the oil-reservoir, and A' an oil-supply chamber, through which the oil passes on its way to the wick-tube B, said chamber A' and wick-tube B being conjoined by a tube or passage, C. The said chamber A' also contains the regulating device, which is, however, attached to the bottom of the oil-reservoir A'.

Said regulating device consists of a float, D, a valve, E, joined to the float D by a valve-stem, F, and a guide, G, through which the said valve-stem passes, and in which it plays freely. The said valve-stem F also passes loosely through a hole, H, formed in the bottom of the reservoir A, and the oil from said reservoir, when not wholly obstructed by the valve E, flows down through said hole into the chamber A'. The float D is adjusted to close the valve E and shut off the flow of oil from the reservoir A whenever the proper height of oil has accumulated in the chamber A'.

To keep the hole H free from obstructions, and at any time to inspect the regulating device, it is necessary that said parts should be readily accessible. This has been done with other regulating devices by placing them in a chamber intermediate between the reservoir and the wick-tube, said intermediate chamber being provided with a special detachable cap or cover, and being connected with the principal oil-chamber by a tubular passage.

This construction occupies too much space, and requires an expenditure of material avoided by my invention.

I construct the reservoir A in such manner that it accurately fits the inside of the upper part of the chamber A', said chamber A forming a cover for the chamber A', as shown at $c$ in Fig. 1, and a bead, $d$, serving as a stop to hold the said reservoir and the supply-chamber in proper relation for the regulating device to act properly; or, if desired, the reservoir A may have a downwardly-projecting rim, accurately fitting the outside of the top of the said chamber A'.

In this way the bottom of the said reservoir forms a cover for the said supply-chamber, and I secure the utmost compactness and ready accessibility of parts, with a notable economy of material.

To obviate trouble with the wick I make the wick-tube telescopic—that is to say, I insert in the wick-tube B an inner sliding and detachable wick-tube, B', to which is attached the wick-feeder I.

The wick $w$ is inserted in the inner tube B', which may be taken out or put in the tube B at pleasure.

Should the wick ever get disengaged from the wick-feeder below the latter, such wick will still be contained in the tube B', which, with its contained wick, may at once be taken out for readjustment. Moreover, by sliding the tube B' in the tube B the height of the wick may be readily adjusted.

I claim—

1. The combination, with the oil-supply chamber A', of the detachable oil-reservoir A, fitted to and forming a cover for the chamber A', substantially as and for the purpose specified.

2. The combination, with the reservoir A and supply-chamber A', the former being a detachable cover for and communicating directly with the latter by the hole H, of a float-valve, attached to the bottom of the chamber A and extending down into the chamber A', for regulating the flow of oil through said hole, substantially as and for the purpose described.

JOHN D. LANE.

Witnesses:
 HENRY T. BROWN,
 FRED. HAYNES.